(12) United States Patent
Fitkin

(10) Patent No.: US 7,774,801 B1
(45) Date of Patent: Aug. 10, 2010

(54) CORBA FIELD PROGRAMMABLE GATE ARRAY/DIGITAL SIGNAL PROCESSOR SYSTEM

(75) Inventor: David W. Fitkin, Anamosa, IA (US)

(73) Assignee: Rockwell Collins, Inc., Cedar Rapids, IA (US)

( * ) Notice: Subject to any disclaimer, the term of this patent is extended or adjusted under 35 U.S.C. 154(b) by 1387 days.

(21) Appl. No.: 11/210,176

(22) Filed: Aug. 23, 2005

(51) Int. Cl.
*G06F 3/00* (2006.01)
*G06F 9/44* (2006.01)
*G06F 9/46* (2006.01)
*G06F 13/00* (2006.01)

(52) U.S. Cl. .................. 719/330; 719/313; 719/316; 719/320; 719/328

(58) Field of Classification Search .................. 719/313, 719/316, 320, 328, 330
See application file for complete search history.

(56) References Cited

U.S. PATENT DOCUMENTS 7,574,710 B1 * 8/2009 Jeyaraman et al. .......... 719/313
2005/0262111 A1 * 11/2005 Li et al. ..................... 707/100
2008/0235712 A1 * 9/2008 Reed et al. .................. 719/328

OTHER PUBLICATIONS

Schmidt, Douglas C., "Middleware for Real-Time and Embedded Systems", Jun. 2002, ACM, pp. 43-48.*
"CORBA Basics® ", Object Management Group Web Site, http://www.omg.org/gettingstarted/corbafaq.htm.
"Introduction to CORBA for Embedded Systems", by Niall Murphy, Embedded Systems Programming Web Site, http:www.embedded.com/98/9810fe2.htm.

* cited by examiner

*Primary Examiner*—Qing-Yuan Wu
(74) *Attorney, Agent, or Firm*—Matthew J. Evans; Daniel M. Barbieri

(57) ABSTRACT

A system and method for communicating with a processing element in a CORBA (Common Object Request Broker Architecture) system does not use an ORB (object request broker) in the processing element. A CORBA location is assigned to the processing element with a host loader and stored in a memory in the processing element. Addresses of CORBA objects are acquired with the host loader and loaded in the memory. The processing element communicates with the CORBA objects using CORBA object addresses. The CORBA objects communicate with the processing element using the assigned CORBA location of the processing element. Data is loaded into the processing element with the host loader.

16 Claims, 2 Drawing Sheets

CORBA FIELD PROGRAMMABLE GATE ARRAY/DIGITAL SIGNAL PROCESSOR SYSTEM

BACKGROUND OF THE INVENTION

The present invention relates to computers, distributed processing systems, and specifically to CORBA (Common Object Request Broker Architecture) for use in a high-performance distributed object system using field programmable gate arrays (FPGA), digital signal processors (DSP), and field programmable object arrays (FPOA).

CORBA is a standard architecture defined by the Object Management Group (OMG) for distributed object systems. The CORBA architecture is an open vendor-independent architecture and infrastructure that allows a heterogeneous collection of distributed objects to communicate and interoperate. The distributed objects are individual units of running software that combine functionality and data. CORBA may be used in web servers that must handle large number of clients, at high hit rates, and with high reliability. CORBA may also be used in real-time systems and embedded systems.

High-performance distributed systems in use today use FPGA, DSP, FPOA processing elements (PE) as part of their processing network. CORBA and other middleware solutions do not work well on these PEs due to the requirement for each processing element to contain its own ORB (object request broker), software that hides transfer of control of one object to another. An external general purpose processor is required to provide the ORB functionality for distributed connectivity to and from the FPGA, DSP, or FPOA. The result is reduced system interconnectivity and damage to the architectural component model.

What is needed is a way to provide the functionality of the ORB in processing elements such a FPGA, DSP, or FPOA of a distributed CORBA system.

SUMMARY OF THE INVENTION

A system and method of communicating with a processing element in a CORBA (Common Object Request Broker Architecture) system without the use of an ORB (object request broker) in the processing element is disclosed. The method comprises loading necessary work product data into the processing element with a host loader that may have an ORB. The CORBA host loader uses knowledge of what CORBA objects the processing element must communicate with and acquires necessary location addresses of the CORBA objects. The CORBA object addresses are placed in an IOR (interoperable object reference) map in the processing element using the host loader. The CORBA object addresses are used to directly communicate with the CORBA objects using a GIOP (general inter-ORB protocol) translator in the processing element. Also placed in the IOR map is a CORBA location for the processing element. The CORBA location for the processing element may be created by the host loader or by an appropriate algorithm in the processing element. In either case, the host loader stores the CORBA location of the processing element and the CORBA objects thereby providing the CORBA objects the ability to send CORBA requests directly to the processing element. The GIOP translator understands CORBA communications directed it by the CORBA objects by knowing the assigned CORBA location of the GIOP translator.

The method of communicating with a processing element in a CORBA system without the use of an ORB in the processing element further comprises translating CORBA communication data packets into commands and data for components within the processing element. The processing element may be a field programmable gate array, a digital signal processor, or a field programmable object array. The processing element communicates with one or more CORBA objects over a transport interface. The processing element may be preloaded or may be loaded from a repository within the host loader with necessary work product data.

It is an object of the present invention to provide a system and method for communicating with a processing element in a CORBA system without using a ORB in the processing element.

It is an object of the present invention to use a loader host to load the processing element in the CORBA system.

It is an advantage of the present invention to eliminate the need for additional processing capacity that provides ORB functionality in a CORBA system.

It is an advantage of the present invention to provide good system interconnectivity within a CORBA system.

It is a feature of the present invention to function with field programmable gate array and digital signal processor processing elements that do not or can not support their own ORB.

BRIEF DESCRIPTION OF THE DRAWINGS

The invention may be more fully understood by reading the following description of the preferred embodiments of the invention in conjunction with the appended drawings wherein.

DETAILED DESCRIPTION

The present invention discloses a system and method for communicating with a processing element (PE) such as a FPGA (field programmable gate array), a DSP (digital signal processor), or a field programmable object array (FPOA) in a CORBA (Common Object Request Broker Architecture) system without the use of an ORB (object request broker) in the processing element.

Figure 1:
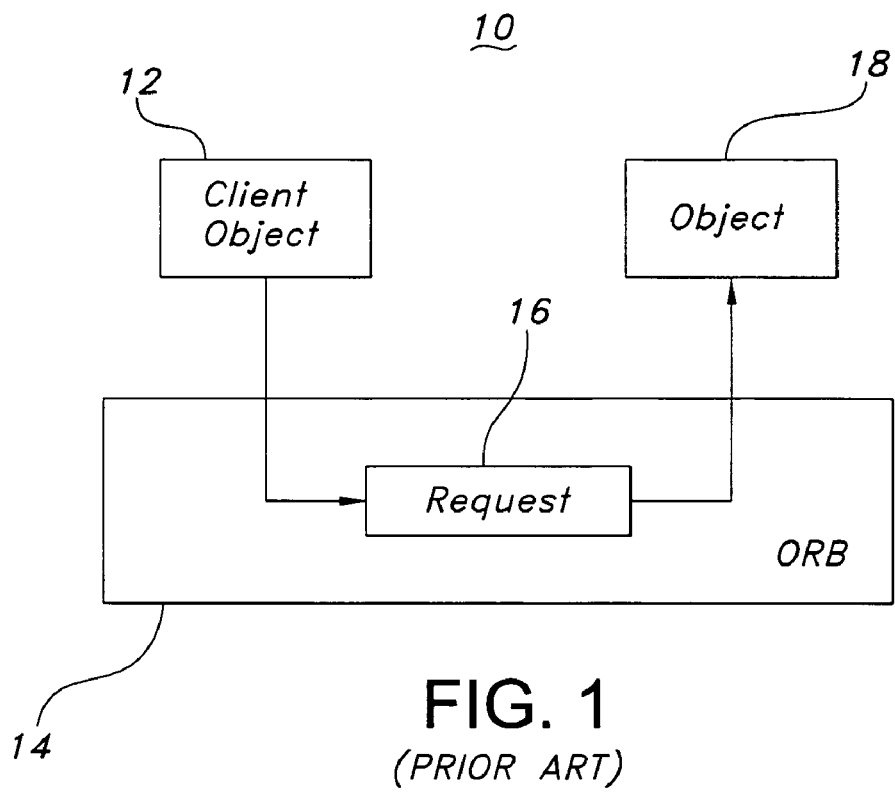
FIG. 1 shows CORBA operation with a request for services of a distributed remote object from a client object.

CORBA is a standard architecture defined by the Object Management Group (OMG) for distributed object systems. FIG. 1 shows CORBA operation 10 with a request 16 for services of a distributed object 18 from a client object 12. The services that the distributed object 18 provides are given by its interface. For each object type an interface in OMG IDL (Interface Definition Language) is defined and every object has its own unique object reference. Distributed objects 18 are identified by object references that are typed by IDL interfaces. The client 12 holds an object reference to the distributed object 18. An object request broker (ORB) 14 locates the remote distributed object 18 on the network, communicates the request 16 to the object 18, waits for the results and when available communicates those results back to the client 12.

The ORB 14 implements location transparency. Exactly the same request mechanism is used by the client 12 and the distributed object 18 regardless of where the object 18 is located. The object 18 may in the same process with the client 12 or remotely located and the client 12 cannot tell the difference. The ORB 14 implements programming language independence for the request 16. The client 12 issuing the request can be written in a different programming language from the implementation of the object 18. The ORB 14 does the necessary translation between programming languages.

Figure 2:
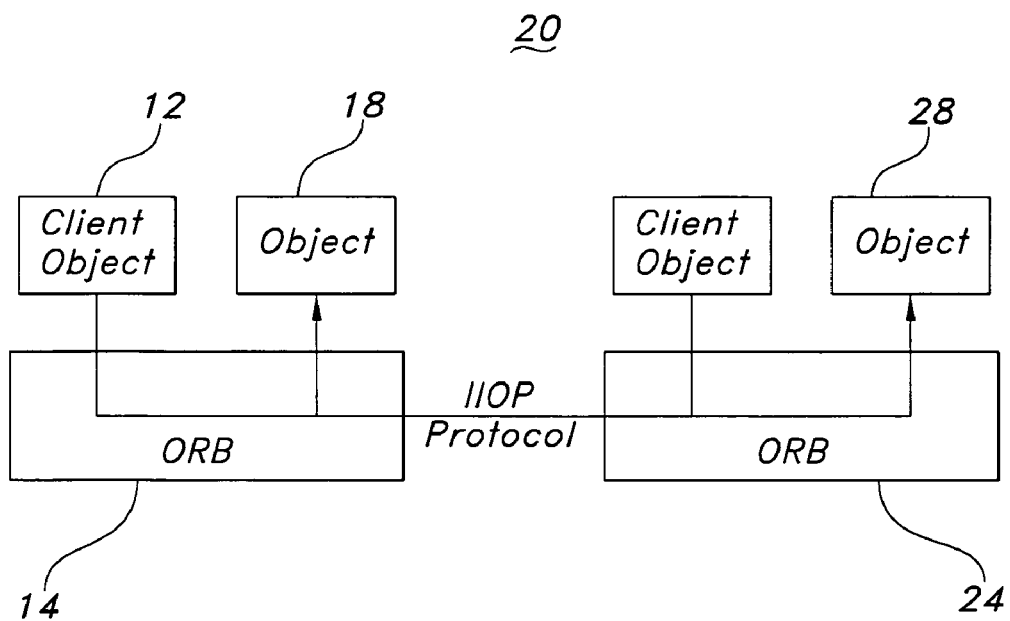
FIG. 2 shows CORBA 2.0 operation that adds interoperability and defines a network protocol called Internet Inter-ORB Protocol.

FIG. 2 shows CORBA 2.0 operation 20 that adds interoperability and defines a network protocol, called IIOP (Internet Inter-ORB Protocol). Client 12, using a CORBA product from any vendor, communicates with a remote distributed object 28, using a CORBA product from any other vendor, through ORB 14 to ORB 24 using the IIOP protocol. IIOP is a TCP/IP implementation of General Inter-ORB Protocol (GIOP), a standard CORBA protocol specified in the OMG CORBA 2.0/GIOP, that specifies a set of message formats and common data representations for communications between ORBs. IIOP works across the Internet or across any other TCP/IP-based implementation.

Figure 3:
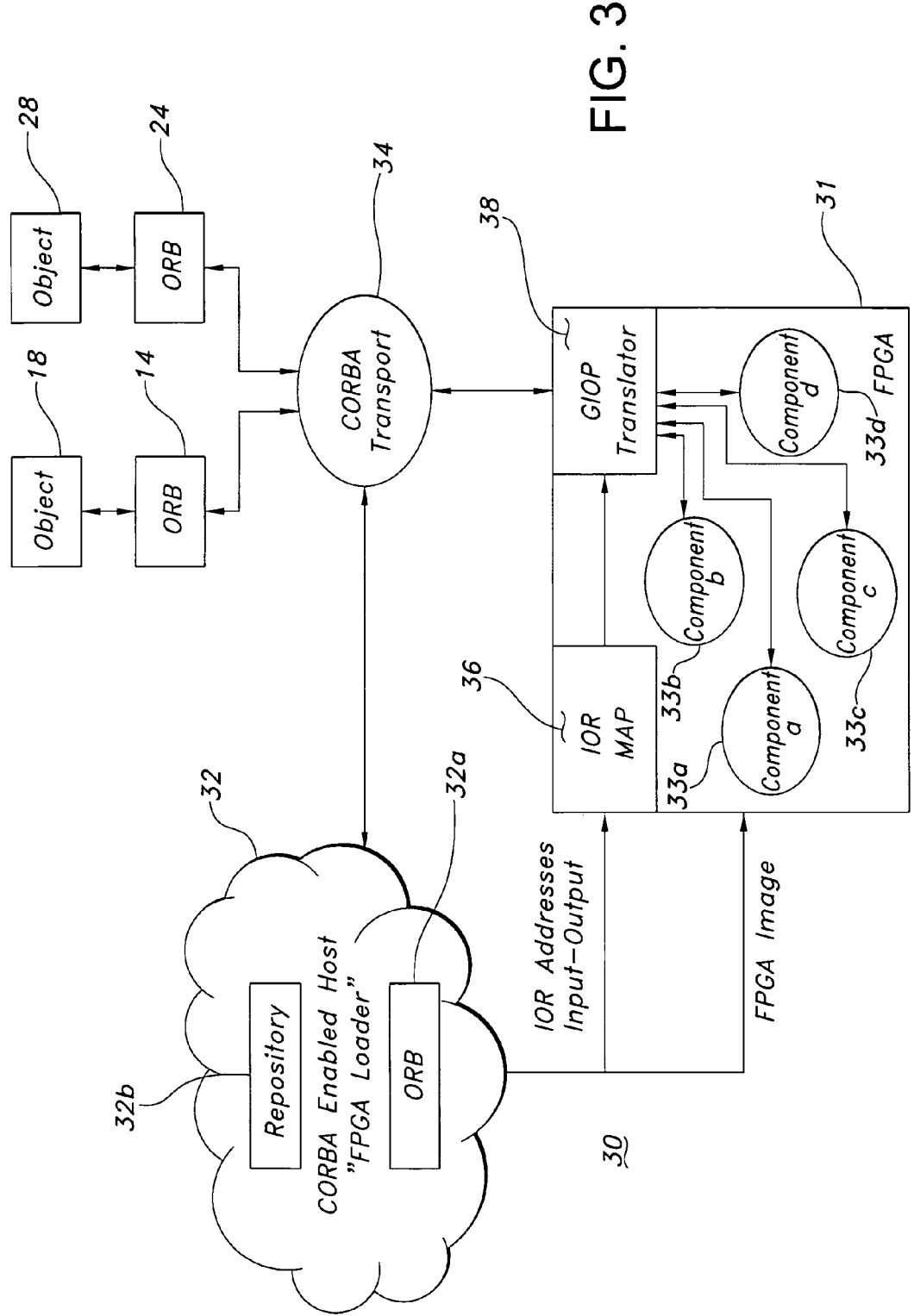
FIG. 3 shows a CORBA FPGA/DSP/FPOA processing element communications system of the present invention.

The present invention, shown in FIG. 3, is for a system and method that enables communications with a FPGA/DSP/FPOA processing element within a CORBA system 30 without an ORB in the processing element. In FIG. 3 a processing element such as a FPGA 31, a DSP (not shown), a FPOA (not shown), or others known in the art is part of the overall embedded system 30 using CORBA. In FIG. 2, the ORB 14 is required on a CORBA-enabled client 12 to get its host component registered into the CORBA network 20. The ORB 14 is also required to acquire the locations of the other CORBA objects 28 and their ORB 24 with which it must communicate in the CORBA network 20 of FIG. 2.

The CORBA system 30 of the present invention discloses that instead of providing an ORB 14 in the FPGA 31, DSP, or FPOA processing element, an ORB 32a in a CORBA-enabled FPGA host loader 32 loads remote object address data and necessary work product data for the FPGA 31, DSP, or FPOA processing element. The host loader 32 may not have an internal ORB 32a for loading the processing element 31 and may use another ORB in the system such as ORB 14 or ORB 24. The CORBA-enabled FPGA host loader 32 may be another CORBA object (18, 28) in the system that is designated as the FPGA host loader and may use its ORB (14, 24). The FPGA 31 is programmable and data loaded into it may come from a repository 32b containing needed work product data within the FPGA host loader 32 or within CORBA object 18 and 28 in the system 30. The FPGA 31 may also be preloaded with needed work product data on an FPGA image input.

The FPGA 31 supplies a block of IOR (interoperable object references) map locations in a shared memory block IOR MAP 36 or some other known location within the FPGA 31. The IOR MAP 36 provides a way of referring to objects 18, 28, and others on the CORBA system 30 and is a string that contains information including an address of an object and a key that distinguishes an object from others on the network. The IOR MAP 36 also stores CORBA location address data for the FPGA processing element 31. This CORBA location address can be created by the host loader 32 or created by an appropriate algorithm supplied by the FPGA processing element 31

CORBA communications data packets are translated in a GIOP (general inter-ORB protocol) translator 38 into commands and data for specific contained components within FPGA 31 such as component a 33a, component b 33b, component c 33c, and component d 33d that perform various functions of the FPGA 31 in the CORBA system 30. Communications between the FPGA 31 and other objects 18 and 28 through their ORBs 14 and 24 respectively is over a CORBA transport interface 34 that may be Ethernet, fiber optic cable, a high-speed data bus or any other data communications means known in the art. The common protocol used for this communications purpose in CORBA systems is GIOP and is the same regardless of what type of a transport interface 34 is used.

In operation, once the FPGA 31 has been successfully loaded with needed work product data, the host loader 32 acquires all necessary CORBA object location addresses from the various objects 18, 28, and others (not shown) in the embedded system and loads the IOR MAP 36 with this location address data that may use its ORB 32a. When this is done, the GIOP translator 38 in the FPGA 31 uses the CORBA object location address data from the IOR MAP 36 to directly communicate to the other CORBA objects 18, 28, and others it needs. The FPGA 31 may need to communicate with only one object 18 or many objects depending on its functional requirements. The number of needed objects 18 may change during CORBA system operation. The GIOP translator 38 is also able to understand CORBA communications data packets directed to it, now that it has available the processing element assigned CORBA location stored in the IOR MAP 36.

It is believed that the CORBA Field Programmable Gate Array/Digital Signal Processor System of the present invention and many of its attendant advantages will be understood by the foregoing description, and it will be apparent that various changes may be made in the form, construction and arrangement of the components thereof without departing from the scope and spirit of the invention or without sacrificing all of its material advantages, the form herein before described being merely an explanatory embodiment thereof. It is the intention of the following claims to encompass and include such changes.

What is claimed is:

1. A method of communicating with a processing element in a CORBA (Common Object Request Broker Architecture) system without the use of an ORB (object request broker) in the processing element comprising the steps of:
    loading necessary work product data into the processing element with a host loader;
    supplying IOR (interoperable object reference) map locations in the processing element;
    identifying an assigned CORBA location of the processing element;
    storing the assigned CORBA location of the processing element in the IOR map locations;
    acquiring necessary addresses of CORBA objects with the host loader alter the processing element is loaded with necessary work product data;
    loading the IOR map locations in the processing element with the host loader with the necessary CORBA object addresses;
    using the CORBA object addresses to directly communicate with the CORBA objects using a GIOP (general inter-ORB protocol) translator in the processing element; and
    directing CORBA data packets to the GIOP translator using the assigned CORBA location of the processing element.

2. The method communicating with a processing element in a CORBA system without the use of an ORB in the processing element of claim 1 further comprising the step of translating the CORBA data packets into commands and data for components within the processing element.

3. The method of communicating with a processing element in a CORBA system without the use of an ORB in the processing element of claim 1 wherein the step of identifying an assigned CORBA location of the processing element comprises creating the assigned CORBA location with the host loader.

4. The method of communicating with a processing element in a CORBA system without the use of an ORB in the processing element of claim 1 wherein the step of identifying an assigned CORBA location of the processing element comprises creating the assigned CORBA location in the processing element.

5. The method of communicating with a processing element in a CORBA system without the use of an ORB in the processing element of claim 1 wherein the processing element may be one of a field programmable gate array, a digital signal processor, and a field programmable object array.

6. The method of communicating with a processing element in a CORBA system without the use of an ORB in the processing element of claim 1 further comprising the step of communicating with one or more CORBA objects over a transport interface.

7. The method of communicating with a processing element in a CORBA system without the use of an ORB in the processing element of claim 1 further comprising the step of preloading the processing element with the necessary work product data.

8. The method of communicating with a processing element in a CORBA system without the use of an ORB in the processing element of claim 1 further comprising the step of loading the processing element with necessary work product data from a repository within the host loader.

9. The method of communicating with a processing element in a CORBA system without the use of an ORB in the processing element of claim 1 wherein the step of loading the necessary work product data into the processing element is performed by using an ORB within the host loader.

10. The method of communicating with a processing element in a CORBA system without the use of an ORB in the processing element of claim 1 wherein the step of loading the necessary work product data into the processing element is performed by the host loader using another ORB in the CORBA system.

11. A CORBA (Common Object Request Broker Architecture) system configured to communicate with a processing element without the use of an ORB (object request broker) in the processing element said CORBA system comprising:
- a host loader configured to load necessary work product data into the processing element;
- CORBA objects whose addresses are acquired with the host loader; and
- the processing element comprising:
  - an IOR memory that is loaded by the host loader with the addresses of CORBA objects and an assigned CORBA location of the processing element; and
  - a GIOP (general inter-ORB protocol) translator configured to communicate directly with the CORBA objects using the CORBA object addresses and wherein the CORBA objects direct CORBA data packets to the GIOP translator using the assigned CORBA location of the processing element.

12. The CORBA system configured to communicate with a processing element without the use of an ORB in the processing element of claim 11 wherein the assigned CORBA location of the processing element is created by one of the host loader and the processing element.

13. The CORBA system configured to communicate with a processing element without the use of an ORB in the processing element of claim 11 wherein the GIOP translator translates the CORBA data packets into commands and data for components within the processing element.

14. The CORBA system configured to communicate with a processing element without the use of an ORB in the processing element of claim 11 wherein the processing element may be one of a field programmable gate array, a digital signal processor, and a field programmable object array.

15. The CORBA system configured to communicate with a processing element without the use of an ORB in the processing element of claim 11 further comprising a transport interface to facilitate the GIOP translator to communicate with one or more CORBA objects.

16. The CORBA system configured to communicate with a processing element without the use of an ORB in the processing element of claim 11 wherein the processing element is loaded with necessary work product data from a repository within the host loader.

* * * * *